United States Patent [19]

Leon

[11] Patent Number: 5,029,597

[45] Date of Patent: Jul. 9, 1991

[54] CONTROLLER FOR CONTROLLING THE OPERATION OF A MOTOR OPERATED VALVE COMBINATION

[75] Inventor: Robert L. Leon, Maple Glen, Pa.

[73] Assignee: Liberty Technology Center, Inc., Conshohocken, Pa.

[21] Appl. No.: 468,026

[22] Filed: Jan. 22, 1990

[51] Int. Cl.⁵ .................... F16K 31/05; G05B 13/02
[52] U.S. Cl. .................... 137/1; 251/129.04; 73/168
[58] Field of Search .............. 73/168; 251/129.01, 251/129.04; 137/1

[56] References Cited

U.S. PATENT DOCUMENTS

| 4,805,451 | 2/1989 | Leon | 73/168 |
| 4,816,987 | 3/1989 | Brooks et al. | 251/129.01 |
| 4,831,873 | 5/1989 | Charbonneau et al. | 73/168 |
| 4,856,327 | 8/1989 | Branam et al. | 73/168 |

Primary Examiner—Arnold Rosenthal
Attorney, Agent, or Firm—Panitch Schwarze Jacobs & Nadel

[57] ABSTRACT

A controller for controlling the operation of a motor operated valve combination, including a valve yoke, a valve stem, a valve disc, a valve seat and a motor operator having a motor and drive means interconnecting the motor to the valve stem for movement of the valve stem in a first direction to move the valve disc into engagement with the valve seat for closing the valve. The controller comprises a sensor for sensing forces experienced by the valve stem during valve closing and for generating related electrical signals. A first detector is employed for receiving the electrical signals from the sensor, for determining when the rate of change in the valve stem forces exceed a first predetermined limit and for generating an electrical signal when the first predetermined limit is exceeded. A second detector receives the electrical signals from the sensor and from the first detector, determines when, after receipt of the signal from the first detector, the forces experienced by the valve stem exceed a second predetermined limit and generates an electrical signal in response thereto. Motor cut-off circuitry receives the electrical signal from the second detector and stops the operation of the motor in response.

16 Claims, 4 Drawing Sheets

CONTROLLER FOR CONTROLLING THE OPERATION OF A MOTOR OPERATED VALVE COMBINATION

BACKGROUND OF THE INVENTION

The present invention relates generally to motor operated valve combinations and, more particularly, to a controller for such a motor operated valve for providing closure assurance upon differential valve pressure conditions.

Motor operated valve combinations or valves are commonly used in nuclear and other power plants to perform routine opening and closing of water and steam lines and, more importantly, for those valves designated as safety related, to perform such opening or closing to assure the prompt, safe shutdown of the plant under accident or other emergency or abnormal operating conditions. For those valves of this class whose safety function is to close a water, steam or other line, it is important that the valve achieve full or complete closure when called upon to do so. Most motor operated valves in use today are controlled by a torque switch which shuts off or stops the operation of the motor when a predetermined valve actuator torque limit is reached and a spring pack or other component moves in response to actuator torque in excess of the limit to trip or actuate the torque switch. Since the torque switch displacement is approximately proportional to the actuator torque above some preload torque, and since the actuator torque is approximately proportional to the stem force, the torque switch displacement set point can be and generally is used to turn off the motor at approximately the valve stem force required to fully close the valve.

However, with this method of motor control, significant stem force inaccuracies can occur for the following reasons. First, the relationship between the actuator torque developed and the torque switch displacement depends upon the rate at which the load is applied, with higher torques and higher forces being achieved at higher rates of loading. Since differential pressure conditions in the valve which may be encountered during accident, emergency or other abnormal operation conditions generally result in slower rates of loading than non-differential pressure conditions or even non-accident or emergency differential pressure conditions, the torques and forces achieved in accident or emergency conditions may be much less than those required for valve closure, even though the valve may have been demonstrated to fully close under non-accident conditions. Second, the valve stem force achieved for a given valve actuator torque depends in part on the condition of the lubrication and engaging surface conditions which exist between the valve stem and the stem nut that drives the valve stem. Lubrication degradation results in lower stem forces for a given valve actuator torque, presenting the possibility that a valve that has been shown to achieve the required forces for closure during normal operating conditions may fail to do so during subsequent accident or emergency operating conditions.

To avoid these problems, this inventor, in U.S. patent application Ser. No. 340,983, filed Jan. 3, 1989, and entitled "Thrust Actuated Control for Motor Operated Valve," now U.S. Pat. No. 4,898,363 presented an apparatus and method for controlling the motor cut-off for a motor operated valve on the basis of the total stem force. However, having the proper stem forces, though a major improvement on the prior art, still does not guarantee sufficient disc force to fully seal off the valve closure area and sufficient additional disc wedging force to prevent leakage through the valve.

Some of the stem force is used to overcome the valve packing forces and some is used to counteract stem rejection forces caused by the internal valve pressure attempting to "spit out" the stem. It would not be unusual for the packing forces to change with time due to hardening or other changes of the packing material, or to be purposefully increased by maintenance personnel attempting to stop a leak. In either event, less force is available for valve closure and for sufficient wedging force for leakage prevention. Also, the condition of the valve disc and valve seat metal sealing surfaces are important factors in determining the force required for valve closure. This force is directly proportional to the resultant disc friction factor which may be initially unknown and which may degrade with time or with repeated closures. Such degradation tends to increase the disc force required for valve closure. Finally, the differential pressure associate with an accident, emergency or other abnormal valve operation condition may have been underestimated when the plant was designed, requiring additional force for valve closure.

Thus, use of a torque switch to control motor shutoff is unacceptable because, for the reasons discussed above, in order to assure valve closure in accident or emergency conditions for all the above possible situations, multiple safety factors must be applied to the torque switch setting. The use of such multiple safety factors generally results in unacceptably high torque and force levels during normal operating conditions, levels which may be high enough to be either unachievable or damaging to the valve and/or valve actuator components.

The present invention overcomes the problems associated with the prior art and assures valve closure and sealing sufficient to prevent leakage through the valve, particularly during accident, emergency or other abnormal operating conditions by controlling motor cutoff on the basis of the valve disc achieving a desired wedging force after the valve closure area is sealed off.

SUMMARY OF THE INVENTION

Briefly stated, the present invention comprises a controller for controlling the operation of the motor of a motor operated valve combination, including a valve yoke, valve stem, valve disc, valve seat and a motor operator having a motor and drive means interconnecting the motor to the valve stem for movement of the valve stem in a first direction to move the valve disc toward and into engagement with the valve seat for closing the valve. The controller comprises sensor means for sensing forces experienced by the valve stem during valve closing and for generating related electrical signals. A first detector means is employed for receiving the electrical signals from the sensor means for determining when the rate of change in the valve stem forces during valve closing exceeds a first predetermined limit indicating that the valve disc has begun wedging into the valve seat, and for generating an electrical signal when the first predetermined limit is exceeded. A second detector means is included for receiving the electrical signals from the sensor means and from the first detector means, for determining when, after receipt of an electrical signal from the first detector means, the forces experienced by the valve stem during valve closing exceed a second predetermined limit indicating that wedging of the valve disc within the valve seat has been sufficient to prevent leakage through the valve, and for generating an electrical signal in response thereto. Motor cut-off means are provided for receiving the electrical signal from the second detector means and for stopping operation of the motor in response thereto.

BRIEF DESCRIPTION OF THE DRAWINGS

The foregoing summary, as well as the following detailed description of a preferred embodiment, will be better understood when read in conjunction with the appended drawings. For the purpose of illustrating the invention, there is shown in the drawings an embodiment which is presently preferred, it being understood, however, that the invention is not limited to the precise arrangement and instrumentalities disclosed. In the drawings.

DESCRIPTION OF PREFERRED EMBODIMENTS

Figure 1:
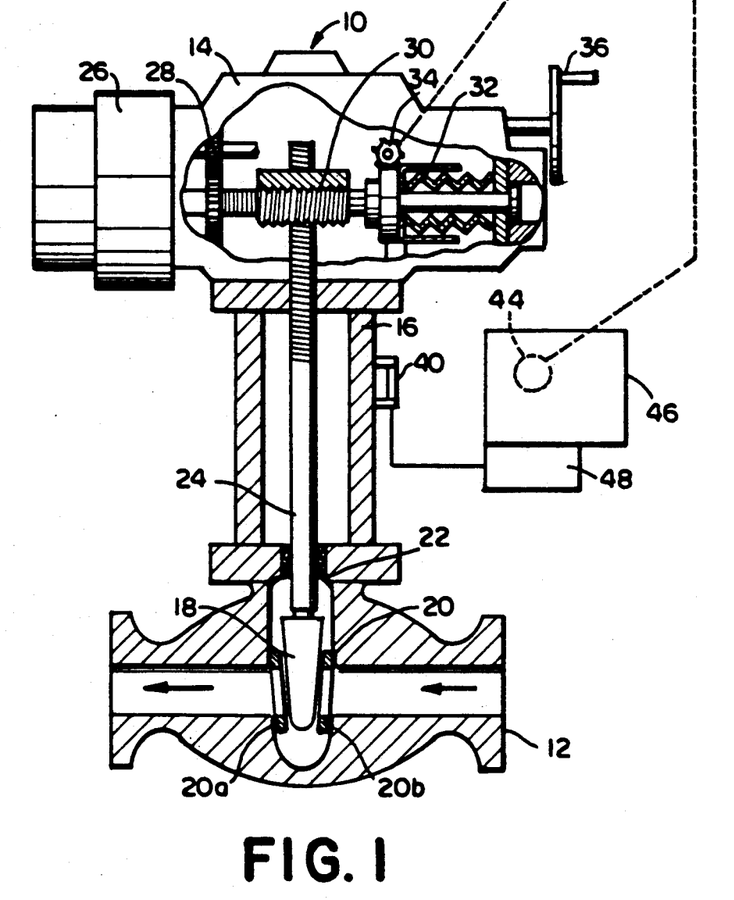
FIG. 1 is an elevational view of a motor operated gate valve shown partially in section and partially broken away, with a preferred embodiment of a controller in accordance with the present invention.

Referring now in greater detail to the drawings, in which like numerals indicate like elements throughout, there is shown in FIG. 1 an elevational view, partially broken away and partially in section, of a motor operated gate valve combination 10. The motor operated gate valve 10 is a type which is generally well known in the art and is commercially available from a variety of sources. The motor operated gate valve 10 includes a valve member 12 and a valve operator 14 which are connected together by a valve yoke 16. The valve member or valve 12 includes a movable valve gate or disc 18, a fixed valve seat 20 including a downstream seat ring 20a and an upstream seat ring 20b, and a fixed valve backseat 22. The valve disc 18 is movable between a "seated" position (not shown) in which it engages the valve seat 20 thereby closing the valve 12 and a "backseated" position (not shown) in which it engages the valve backseat 22. As shown in FIG. 1, the valve disc is in an intermediate position part way between the seated and backseated positions.

The valve disc 18 moves between the seated and backseated positions by the action of a valve stem 24, one end of which is secured to the valve disc 18. The valve stem 24 extends through suitable openings in the valve 12 and valve yoke 16 with the other end extending into the valve operator 14, as shown. Where it extends through the valve 12, it is sealed against leakage by packing material (not shown).

The valve operator 14 is comprised of a motor 26 which in the present embodiment is shown as being an electric motor. The output shaft of the motor 26 is connected through suitable reduction gears 28 to a combination worm and worm gear, shown collectively as 30. The worm gear 30 surrounds and is drivingly engaged with a drive sleeve (not shown) which in turn is drivingly engaged with a stem nut (not shown). The stem nut threadingly engages Acme type threading on the upper end of the valve stem 24. Since the stem nut is restrained from axial movement and the stem is restrained from rotating, rotation of the stem nut results in corresponding vertical or axial movement of the valve stem 24. The direction of movement of the valve stem 24 depends upon the direction of movement of the output shaft of the motor 26 and the corresponding direction of rotation of the stem nut. Of course, the vertical movement of the valve stem 24 results in corresponding movement of the valve disc 18 to open or close the valve 12. During the valve opening or closing operation, both thrust and torque exist between the valve stem 24 and the stem nut as a result of the Acme threads. As the valve disc 18 engages the valve seat 20 the compressive stem thrust generates a reaction torque on the stem nut, drive sleeve and worm gear which shows up as an axial force on the worm.

The distal (rightmost) end of the worm is connected to a spring pack 32 which allows the worm to move axially proportional to the reaction torque. A separate small gear 34 is also connected to the worm by way of the spring pack 32. The gear 34, in turn, is connected to a torque switch 44 housed in switch compartment 46 along with standard limit switches (not shown). The torque switch 44 is used for deactivating or stopping the motor 26 when the gear 34 is turned a preset amount as a result of the displacement of the spring pack 32. Since the generated torque is approximately proportional to the stem force, the torque switch 44 is commonly adjusted to stop the motor 26 at the desired stem force.

As the valve operator 14 operates to close the valve 12, it develops torque and compressive forces on the valve stem 24 through the action of the Acme threads on the valve stem 24 and stem nut. The relationship between the developed stem forces and the stem nut torque is a function of the thread geometry and the lubrication or lack thereof. For most threads, the thrust for a given torque is nearly halved as the friction is doubled. Since the coefficient of friction may easily vary between 0.10 and 0.20, a substantial decrease in delivered thrust may arise as lubricant between the threads is squeezed out in use or, alternatively, as such lubricant hardens due to age and/or lack of use. This could significantly jeopardize the ability of the valve to close or to close sufficiently to prevent leakage through the valve.

In order to determine whether the valve operator is delivering sufficient closing thrust to fully seat the valve disc 18 on the valve seat 20 and thereby fully close the valve 12, a test is usually conducted under zero differential pressure conditions, primarily because of the great difficulties involved in actually placing a particular differential pressure across the valve 12. Generally, after the valve disc 18 is seated, but before the motor 26 is turned off, thrust within the valve stem 24 can build up very rapidly. Since it takes time for the worm to move in response to the force being exerted on it by the worm gear, the displacement of the spring pack 32 is usually delayed with respect to the development of such thrust or the torque. Thus, when the spring pack displacement finally gets to the position in which the torque switch is opened to deactivate the motor 26, the force or torque may be much higher than what it would have been had the loading been much slower. However, under severe differential pressure conditions, such as accident or emergency conditions, for which the valve 12 is supposed to achieve its specified thrust, the loading rate is substantially slowed down by the differential pressure impeding the motion of the valve disc 18 as it moves toward and engages the valve seat 20. Thus, for valves which load up rapidly when seating under no differential pressure, there may be a substantial reduction in the thrust at motor turnoff in the differential pressure condition where the thrust is really needed to properly and fully close the valve to prevent leakage. Some comparison tests have indicated that thrust reductions of up to 40% may arise. In such situations, a motor operated valve of this type, which has been demonstrated to develop sufficient thrust in a non-differential pressure test, may not effectively operate to fully close the valve during an accident or emergency condition.

Figure 4:
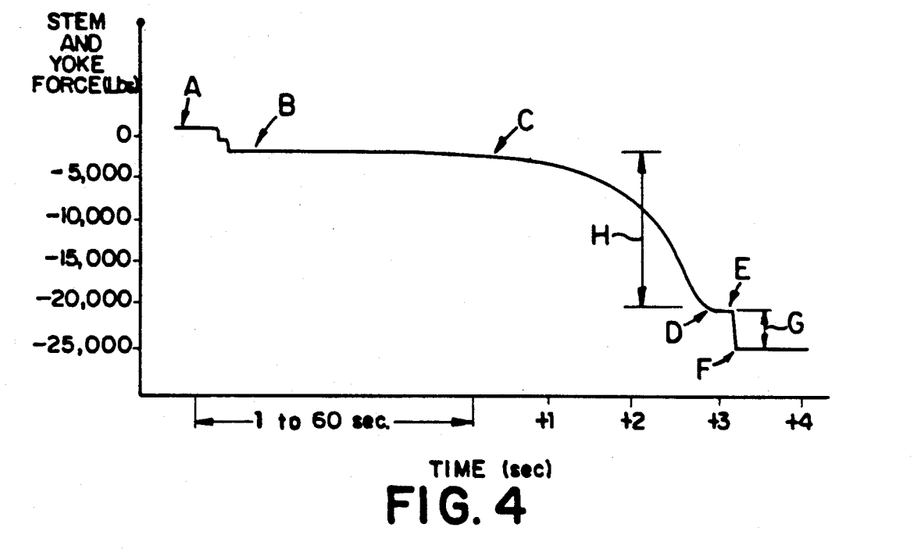
FIG. 4 is a graphic illustration showing variations in valve stem and yoke forces as a function of time as the gate valve of FIG. 1 closes under differential pressure.

A typical stem and yoke force trace as a function of time is shown in FIG. 4 for the motor operated gate valve 10 when closing under differential pressure, i.e., high pressure upstream of the valve 12, low pressure downstream. When the valve starts to close (point A), the initial stem tension due to packing force left from when the valve previously opened is converted into stem compression (point B) as the valve stem 24 moves into the valve 12 through the packing. As the valve disc 18 begins to substantially cover the valve opening (point C), the upstream pressure pushes the valve disc 18 against the downstream valve seat 20a resulting in increased friction forces against the valve seating surfaces (i.e., the surface of the valve disc 18 and the downstream valve seat 20a). The friction force continues to increase until the valve disc 18 completely covers the valve opening (point D), at which time the friction force is substantially equal to the differential pressure force experienced by the valve 12. The magnitude of the differential pressure force (illustrated by force difference H) is generally equal to the closure area of the valve disc 18 times the differential pressure on the valve 12 times the coefficient of friction of the valve seating surfaces. At this time, the flow through the valve is stopped and the valve stem force is generally equal to the packing force plus the differential pressure force on the valve 12. A small valve stem rejection force may also exist, but has not been illustrated in FIG. 4 for the purpose of clarity.

The valve disc 18 then slides along or around the downstream portion of the valve seat 20 until it can move no more. During this period of valve disc sliding movement, the valve stem force remains substantially constant, as shown by the portion of the trace between points D and E. Though the flow through the valve 12 has been substantially stopped, leakage through the valve 12 is still possible. The continued operation of the motor operator 14 begins to wedge the valve disc 18 into the valve seat 20 (point E) between the upstream and downstream portions of the seating surfaces. Since the motion of the valve disc 18 is substantially stopped, the additional valve stem force, termed "disc wedging force," builds very rapidly (illustrated by force difference G) until the torque switch 44 trips and stops the motor 26 (point F). The wedging force further seats the valve disc 18 within the valve seat 20 to prevent leakage through the valve 12.

Figure 5:
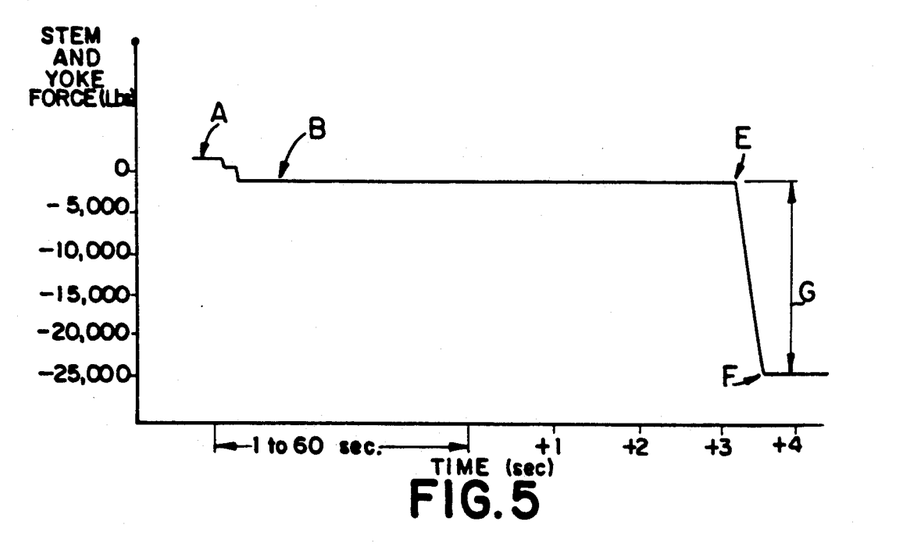
FIG. 5 is a graphic illustration showing variations in the valve stem and yoke forces as a function of time as the gate valve of FIG. 1 closes when not under differential pressure.

A typical stem and yoke force trace as a function of time for the motor operated gate valve 10 when closing under no differential pressure is shown in FIG. 5. A compressive packing force (point B) is impressed on the valve stem 24 as before as the valve stem moves through the packing and into the valve 12. But, unlike when operating under differential pressure (FIG. 4), since there is no pressure forcing the valve disc 18 against the downstream portion of the valve seat 20, there is no substantial buildup of any valve disc friction force. In fact, it is not until the valve disc 18 begins to wedge into the valve seat 20 (point E) that the valve stem force begins to build again and, since the valve disc motion is substantially stopped, the disc wedging force builds very rapidly (G) until the torque switch 44 trips and stops the motor 26 (point F).

As indicated previously, it is much more convenient to test the operation of the valve without applying differential pressure than it is to test the valve with differential pressure applied, especially accident level differential pressure. Unfortunately, it cannot be assumed that a torque switch that trips at a valve stem force of 25,000 lbs to stop the motor under no differential pressure, as shown in FIG. 5, will also trip at a valve stem force of 25,000 lbs. when under accident level differential pressure and provide a 5,000 lb. disc wedging force as shown in FIG. 4. Instead, the rate of loading problems discussed above may cause the torque switch to trip at up to a 40% lower valve stem force, i.e., at a valve stem force of 15,000 lbs. Such a reduced valve stem force is about 5,000 lbs. less than the valve stem force required just for flow cutoff through the valve. Thus, the valve shown to develop enough force to stop all flow including leakage in the simple test would not, in fact, do so when really needed under high differential pressures. In addition, even if the rate of loading difference did not cause a problem, the degradation of lubricant between the valve stem and the stem nut with time certainly could. The lubricant degradation factor could cause the developed valve stem force to be even less than 15,000 pounds. For both those situations, the torque switch would prevent proper valve closure by tripping and stopping the motor 26 too early.

Figure 2:
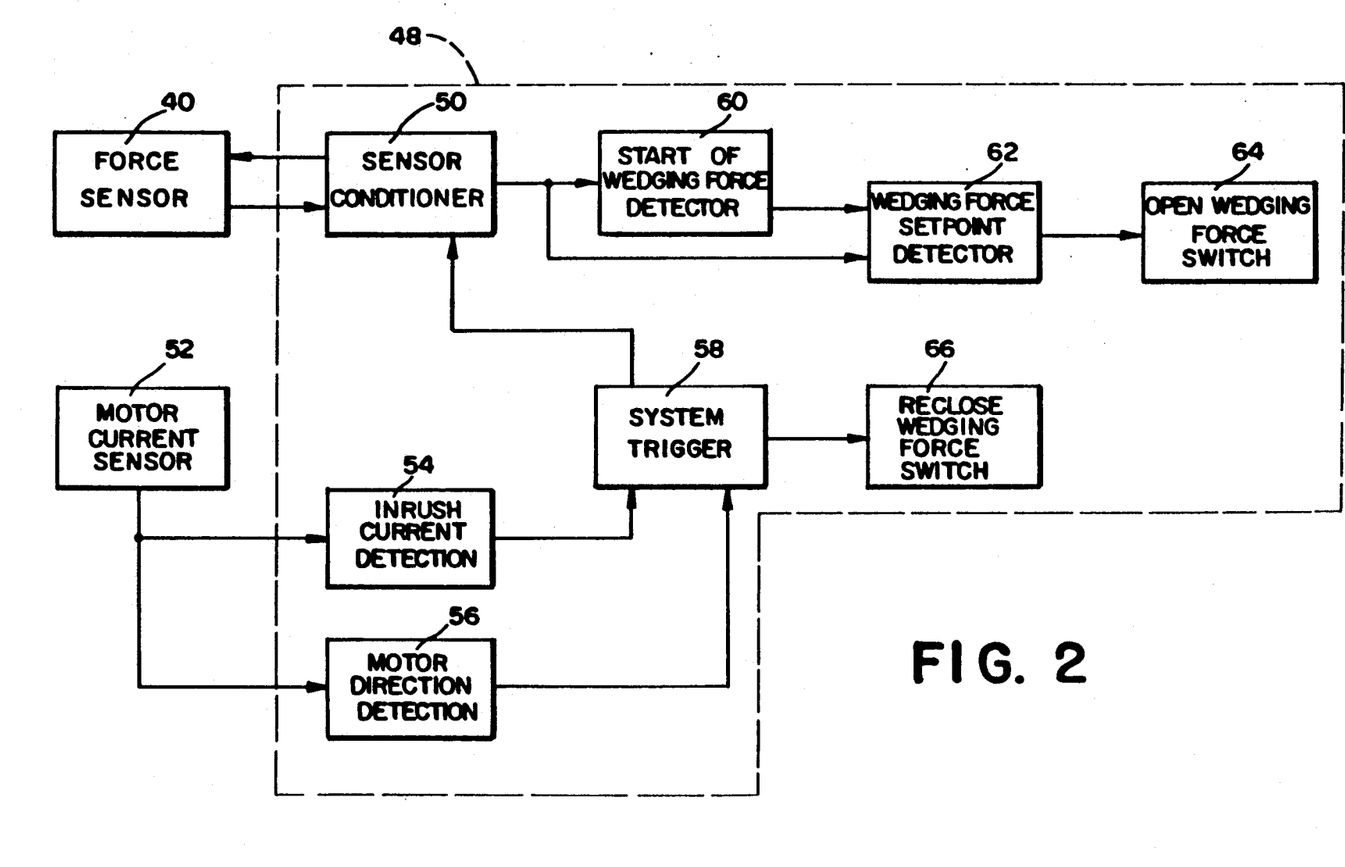
FIG. 2 is a functional block diagram of the controller of FIG. 1.

The present invention overcomes these problems by providing a controller for controlling the operation, and particularly the shutoff or stopping of the motor 26 during valve closing differently than by means of the torque switch. Shown on the valve yoke 16 is a preferred embodiment of the controller which includes a force sensing means or force sensor 40 in accordance with the presently preferred embodiment of the present invention. In the present embodiment, the force sensor 40 comprises a strain gage type extensometer that experiences tensile strain which is proportional to valve yoke tensile forces and which is equal and opposite to the compression forces experienced by the valve stem 24 as the valve closes or seats. A presently preferred embodiment of the circuitry for the controller, which is illustrated in functional block form in FIG. 2, is housed in a small controller compartment 48, as shown in FIG. 1.

One example of a force sensor 40 which may be employed is shown and described in detail in the inventor's U.S. Pat. No. 4,805,451 which is incorporated herein by reference. Complete details of the structure and operation of the force sensor 40 may be obtained by reference to the cited patent, particularly FIGS. 4-6 and the corresponding portion of the specification, and need not be presented herein for a complete understanding of the present invention. Suffice it to say that the force sensor 40 effectively senses (through the valve yoke 16) forces experienced by the valve stem 24 and generates electrical signals which are related to the valve stem forces. Thus, changes in the electrical signals generated by the force sensor 40 are substantially proportional to changes in the valve stem forces which occur during closing of the valve 12.

It will be appreciated by those skilled in the art that while, in the presently preferred embodiment, the force sensor 40 is shown and described as being mounted on the valve yoke 16, the force sensor 40 could be at some other location. Examples of such other locations include: on the housing of the motor operator 14; within the motor operator 14, such as between the valve stem nut and lock nut, between the upper bearing and the operator housing, and between the drive sleeve and the upper bearing; between the valve yoke 16 and the motor operator 14; and directly on the valve stem 24. The location of the force sensor 40 may vary from valve to valve, depending upon a variety of factors, including the particular valve structure, the particular valve application, the size of the surrounding area, etc. Thus, the present invention is not limited by a particular location of the force sensor 40.

It will also be appreciated by those skilled in the art that while in the presently preferred embodiment the force sensor 40 is of the type disclosed in the aforementioned U.S. patent, other types of sensor means or force sensors may alternatively be employed. For example, the force sensor may be a strain gage or strain gage type sensor, a linear variable differential transformer (LVDT), a proximity probe, a capacitance probe or an optical probe to sense deformations or forces between components, or it may be a motor current sensor or a motor power sensor, all of which are generally known in the art. Thus, the present invention is not limited to a particular sensor structure or type of sensor.

Again referring to FIG. 2, note that the force sensor 40 is electrically connected to a sensor conditioner 50 which provides power to the force sensor 40 and offsets and amplifies the electrical signals received from the force sensor 40, as required. Since the valve 12 only operates periodically, the sensor conditioner 50 need operate only when the valve operates. A motor current sensor 52 is used to sense or detect the inrush current of the motor 26 by an inrush current detection circuit 54. The motor current sensor 52 is on one of the reversing leads of the typically three-phase motor 26, so that comparing its phase with the line voltage that powers the controller establishes the motor direction and thus the direction of valve operation. Alternatively, two motor current sensors can be used, one on a reversing lead and one on the non-reversing lead, and, again, the phase between the two leads establishes the motor direction. If the motor 26 is determined to be operating in a direction which results in valve closing, a turn-on or system trigger 58 is actuated to actuate the sensor conditioner 50. Another alternative is to use indicator light circuits, which are standard in motor operated valves, to determine that the valve is closing, for example, activation of the circuit to extinguish a red indicator light shows that the valve is closing and is approaching its seated position. This occurs commensurate with the closing of the open torque bypass switch which also may be used to activate the sensor conditioner 50.

The conditioned signals from the output of the sensor conditioner 50 are applied to the input of a first detector means or start of wedging force detector 60. The first detector means 60 receives the electrical signals from the sensor conditioner 50 which are related to forces experienced by the valve stem 24 during valve closing and takes the time derivative of the electrical signals to develop a signal indicative of the rate of change of the valve stem forces. The time derivative is obtained in the present embodiment utilizing standard time derivative circuitry of a type well known in the art and commercially available from a variety of sources. The derivative of the electrical signals is compared to a first predetermined limit to detect or identify a sudden negative increase in valve stem forces indicating that the valve disc 18 has begun wedging into the valve seat 20, as described above and illustrated at point E on FIGS. 4 and 5. The first predetermined limit may be established by reference to the slope of the trace for the valve between points E and F of FIGS. 4 and 5. The first detector means 60 generates an electrical output signal when the first predetermined limit is exceeded.

The conditioned signals from the output of the sensor conditioner 50 and the output signal from the first detector means 60 are applied to the inputs of a second detector means or wedging force setpoint detector 62. The second detector means 62 receives the two signals and determines when, after receipt of the signal from the first detector means 60 indicating that valve disc wedging has begun, the valve stem forces exceed a second predetermined limit indicating that wedging of the valve disc 18 within the valve seat 20 has been sufficient to prevent leakage through the valve 12. Again, the second predetermined limit may be established by reference to point F on the trace (FIGS. 4 and 5) for the valve. The second detector means 62 generates an electrical output signal when the second predetermined limit is exceeded.

The output signal from the second detector means 62 is applied to the input of a motor cut-off means or wedging force switch 64. The motor cut-off means 64 receives the signal from the second detector means 62 and stops the operation of the motor 26 in response thereto. The motor cut-off means 64 may include one or more relays or other switching devices (not shown), as well as suitable control and biasing circuitry (not shown). In this manner, the motor 26 continues to operate to power the valve operator 14 for closing the valve 12 until sufficient valve stem force is developed to wedge the valve disc 18 within the valve seat 20 in a manner which is sufficient to prevent leakage through the valve, particularly under accident, emergency or other abnormal operating conditions and without regard to the degree of differential pressure applied to the valve 12 even though the torque switch may have opened prematurely for the reasons discussed above.

While the functional block diagram of the basic circuitry of the presently preferred embodiment of the invention is illustrated in FIG. 2 and described above, it will be appreciated that the invention may be implemented utilizing different circuitry. It will also be appreciated that the particular manner in which the block diagram of FIG. 2 is specifically implemented is well within the skill of an ordinary designer and that particular circuits, components, etc. will vary depending upon the specific design approach employed.

Figure 3A:
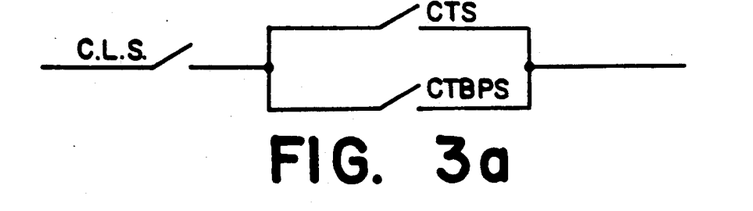
FIGS. 3a, 3b, 3c, 3d and 3e are schematics of control circuitry for a motor operated valve in the closing direction, illustrating the manner in which the present invention may be employed to modify the standard motor control circuitry.

FIG. 3a shows schematically the control switch scheme presently used in motor operated valves. The close limit switch (CLS) is normally permanently shunted closed. The close torque switch (CTS) is closed at the beginning of the valve closing operation, as is the close torque bypass switch (CTBPS), thus maintaining continuity of the control circuit and thereby keeping the motor 26 running. When the valve stem 24 reaches a certain percentage of its full stroke, the close torque bypass switch opens, thereby arming the close torque switch to shut off or stop the motor 26, which occurs when it opens.

Figure 3B:
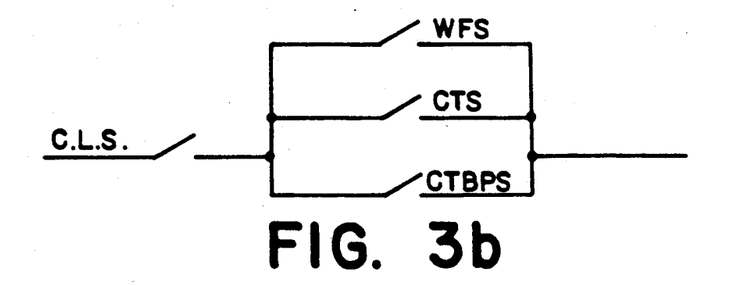

FIG. 3b shows a first configuration of the present invention with the wedging force switch (WFS) 64, as described previously, connected in parallel with the close torque switch and the close torque bypass switch. In this configuration, the motor 26 stops only after the close torque bypass switch has opened and both the close torque switch and the wedging force switch open. Thus, with this configuration, the motor 26 is prevented from shutting off too early due to a torque switch that trips too early as a result of the rate of loading or lubrication problems discussed above. The motor 26 continues to operate in the differential pressure condition until the proper wedging force is achieved to prevent leakage flow through the valve 12. In the example illustrated in FIG. 4, a 5,000 lb. wedging force (G) would be achieved regardless of the differential pressure applied to the valve, the disc friction coefficient, or the packing force. In non-differential pressure operation (FIG. 5), the close torque switch trip point exceeds the wedging force switch trip point and thus the wedging force switch trips first so that the close torque switch operates to stop the motor 26 The opening of the wedging force switch 64 is detectable by a sudden increase in the level of the current flowing through the close torque switch and thus the wedging force switch trip point can be verified in order to test the circuitry.

Figure 3C:
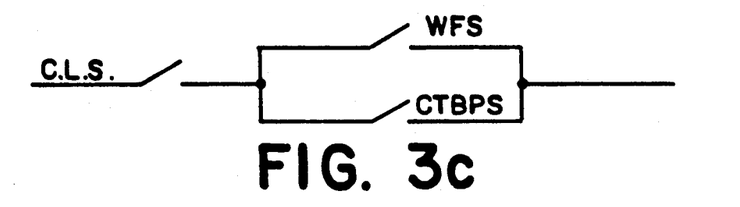

FIG. 3c shows a second configuration of the present invention in which the wedging force switch 64 simply replaces the close torque switch and is connected in parallel with the close torque bypass switch. Operation under differential pressure is the same as it was in the configuration shown in FIG. 3b. However, under non-differential pressure operation, the valve would achieve only the packing force plus the 5,000 lb. disc wedging force before the wedging force switch 64 trips to stop the motor 26. Over several valve closing cycles, the reduced force under non-differential pressure operating conditions could result in significantly less wear on both valve and valve actuator parts.

Figure 3D:
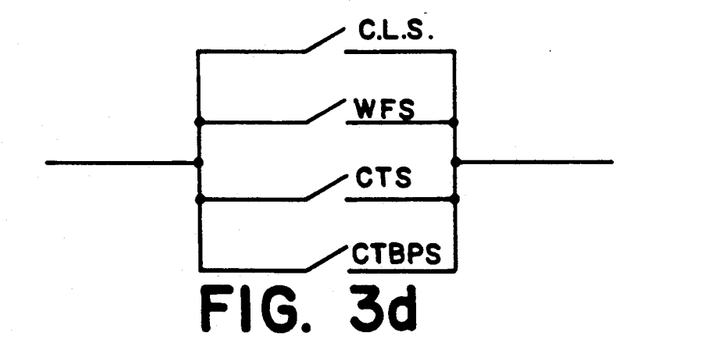
Figure 3E:
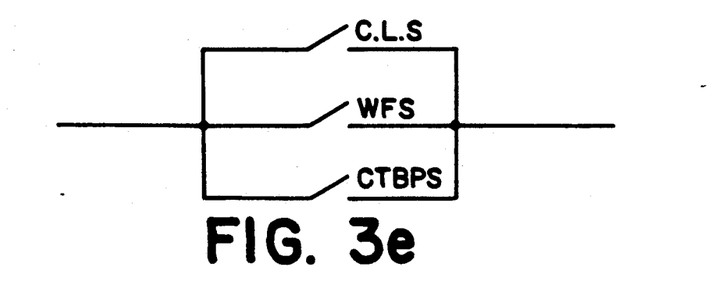

In both of the above-discussed configurations, some additional safety factor against premature motor shutoff as a result of a malfunctioning wedging force switch 64 can be achieved by reactivating the close limit switch, and connecting it in parallel with the wedging force switch 64 and/or using its opening function to provide an arming signal to the first detector means or start-of-wedging force detector 60. Since the close limit switch can be set to open when the valve stem 24 is just a fraction of an inch from its disc wedging position, this scheme can help to reduce spurious preopening of the wedging force switch and help to reduce the consequences which may occur when premature wedging force switch opening still occurs. FIGS. 3d and 3e illustrate configurations of the present invention in which the close limit switch is connected in parallel with the configurations shown in FIGS. 3b and 3c, respectively.

It has been mentioned above that the only required characteristic of the force sensor 40 is that a change in the valve stem forces results in an approximately proportional change in the electrical output of the force sensor 40. These criteria make a motor current sensor and/or a motor power sensor acceptable as a force sensor 40 as embodied in the present invention. It should be pointed out, though, that any sudden loading of the motor may cause a sudden increase in the electrical output of either a motor current sensor or a motor power sensor and some such sudden loading events may not be due to the onset of disc wedging but, instead, may be due to such things as a burr on the stem or gear threads, a bent stem, gear backlash, or significantly reduced lubrication. The reuse of the close limit switch, as described above however, would substantially reduce the chances of such non-wedging force events fooling the controller into characterising them as disc wedging.

As discussed above, the onset of disc wedging occurs when the valve stem 24, valve disc 18 and valve seat 20 force a solid metal stack-up. The rapid force buildup occurs as a result of the motor action continuing to push against that solid metal stack-up. The rate of the force buildup remains fairly constant for a given motor operated valve. As a result, a fixed time delay after the onset of the disc wedging force can be used to approximate the desired wedging force. The time delay required could be determined from a non-differential pressure test in which the force as a function of time is measured and a trace similar to that of FIG. 5 is prepared.

The second detector means 62 could thus be replaced by a timer means (not shown) which would generate an electrical output signal after the expiration of a predetermined time from receipt of the electrical signal from the first detector means 60. The output signal from the timer means would be applied to trip the wedging force switch 64 in the manner described above.

It should be obvious to someone knowledgable about motor operated valves that red and green lights or other indicator circuits could be used as well to turn on the sensor conditioner 50 and to activate the system trigger 58 for activating circuitry 66 to reclose the wedging force switch 64.

Figure 6:
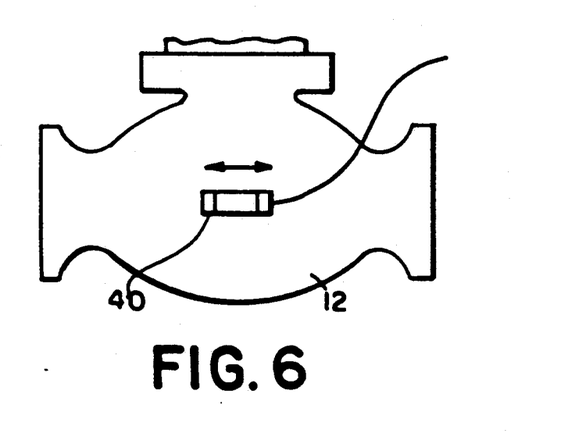
FIG. 6 is an elevational view of a portion of the valve body of FIG. 1 showing an alternate location of a sensor.

As an alternate embodiment of the present invention, a sensor means or sensor 40 could be positioned directly on the body of the valve 12 in the manner illustrated in FIG. 6. In this manner, the sensor means 40 is predominantly sensitive to the wedging forces which occur as the valve disc 18 is wedging into the valve seat 20 and is less sensitive with respect to other sources of stem force. Placement of the sensor means 40 on the body of the valve 12 offers improved detection of the onset of wedging, as well as improved sensitivity with respect to the increase in wedging force. In this location, the sensor means 40 is relatively insensitive to packing forces and stem rejection forces and is only moderately sensitive to differential pressure forces through the valve. A sensor means 40 positioned on the body of the valve 12 can be calibrated with respect to the associated stem force in a non-differential pressure test when all of the other forces are either maintained constant or do not exist, utilizing procedures described in U.S. Pat. No. 4,805,451.

As a further variation, in which the sensor means 40 is located on the valve yoke 16 or some other such location, a less effective control system, yet a substantial improvement over current systems, employs the first detector means 60 to establish the sum of the packing forces and the valve stem rejection forces shortly after the initiating trigger (i.e., at point B of FIGS. 4 and 5). The second detector means 62 is then employed to generate an electrical output signal when the force level changes from that occurring at the initiation of an output signal from the first sensor means 60 by an amount equal to the sum of a calculated maximum differential pressure force plus the desired wedging force. A controller which employs this method would not take into account changes in the actual required differential pressure force, but would still account for changes in packing forces and would be insensitive to rate of loading and lubrication degradation problems of the type described above.

Not yet addressed is the subject of using the controller of the present invention to shut off the motor 26 on the opening stroke. Typically, this would not be necessary as it is common practice in the art to bypass the open torque switch during the portion of the stroke when the valve disc 18 is being pulled out of the valve seat 20 so that the motor is not turned off by the torque switch. Also, the end of the valve open stroke is usually controlled by a limit switch which is set to trip and stop the motor prior to backseating of the valve disc 18.

From the foregoing description, it can be seen that the present invention comprises a controller for controlling the operation of a motor operated valve which assures proper closure and leakage prevention under all possible operating conditions. The controller is easily adaptable and retrofittable to existing motor operated valves. It will be appreciated by those skilled in the art that changes of the type discussed above, as well as other changes, could be made to the described embodiment without departing from the broad inventive concepts thereof. It is understood, therefore, that this invention is not limited to the particular embodiment disclosed, but it is intended to cover all modifications which are within the scope and spirit of the invention as defined by the appended claims.

I claim:

1. A controller for controlling the operation of the motor of a motor operated valve combination including a valve yoke, a valve stem, a valve disc, a valve seat and a motor operator having a motor and drive means interconnecting the motor to the valve stem for movement of the valve stem in a first direction to move the valve disc toward and into engagement with the valve seat for closing the valve, the controller comprising:

sensor means for sensing a parameter indicative of the forces experienced by the valve stem during valve closing and for generating related electrical signals;

first detector means for receiving the electrical signals from the sensor means, for determining when the time rate of change in the valve stem force parameter during valve closing exceeds a first predetermined limit indicating that the valve disc has begun wedging into the valve seat and for generating an electrical signal when the first predetermined limit is exceeded;

second detector means for receiving the electrical signals from the sensor means and from the first detector means for determining when, after receipt of an electrical signal from the first detector means, the parameter change exceeds a second predetermined limit indicating that the wedging force of the valve disc within the valve seat has been sufficient to prevent leakage through the valve and for generating an electrical signal in response thereto; and motor cut-off means for receiving the electrical signal from the second detector means and for stopping operation of the motor in response thereto.

2. The controller as recited in claim 1 wherein the sensor means is comprised of an extensometer.

3. The controller as recited in claim 1 wherein the sensor means is located on the valve yoke.

4. The controller as recited in claim 1 wherein the sensor means is located on the motor operator.

5. The controller as recited in claim 1 wherein the sensor means is located on the valve stem.

6. The controller as recited in claim 1 wherein the sensor means is located within the motor operator.

7. The controller as recited in claim 1 wherein the sensor means is located between the valve yoke and the motor operator.

8. The controller as recited in claim 1 wherein the sensor means is located on the valve body.

9. The controller as recited in claim 1 wherein the sensor means is comprised of a motor power sensor.

10. The controller as recited in claim 1 wherein the sensor means is comprised of a motor current sensor.

11. The controller as recited in claim 1 wherein the sensor means comprises a sensor which generates electrical output signals which change approximately proportionally to changes which occur in the forces experienced by the valve stem during valve closing.

12. A controller for controlling the operation of the motor of a motor operated valve combination including a valve yoke, a valve stem, a valve disc, a valve seat and a motor operator having a motor and drive means interconnecting the motor to the valve stem for movement of the valve stem in a first direction to move the valve seat for closing the valve, the controller comprising:

sensor means for sensing a parameter indicative of the forces experienced by the valve stem during valve closing and for generating electrical output signals which change generally proportionally to changes in the valve stem forces;

first detector means for receiving the electrical signals from the sensor means, for reading the electrical output signal to indicate the packing and stem rejection forces experienced by the valve stem after starting to move in the closing direction, and for generating an electrical output signal indicating that such reading has taken place;

second detector means for receiving the electrical signals from the sensor means and the indicating signal and the indicated force from the first detector means for determining when, after receipt of the indicating electrical signal from the first detector means, the increased forces experienced by the valve stem during valve closing over and above the indicated force from the first detection means exceed a second predetermined limit indicating that the force to overcome the expected differential pressure force was sufficient to close the valve and that wedging force of the valve disc within the valve seat has been sufficient to prevent leakage through the valve and for generating an electrical signal in response thereto; and motor cut-off means for receiving the electrical signal from the second detector means and for stopping operation of the motor in response thereto.

13. A controller for controlling the operation of the motor of a motor operated valve combination including a valve yoke, a valve stem, a valve disc, a valve seat and a motor operator having a motor and drive means interconnecting the motor to the valve stem for movement of the valve stem in a first direction to move the valve disc toward and into engagement with the valve seat for closing the valve, the controller comprising:

sensor means for sensing a parameter indicative of the forces experienced by the valve stem during valve closing and for generating related electrical signals;

first detector means for receiving the electrical signals from the sensor means, for determining when the time rate of change in the valve stem force parameter during valve closing exceeds a first predetermined limit indicating that the valve disc has begun wedging into the valve seat and for generating an electrical signal when the first predetermined limit is exceeded;

timer means for receiving the electrical signal from the first detector means and for generating an electrical output signal a predetermined time thereafter; and motor cut-off means for receiving the electrical output signal from the timer means and for stopping operation of the motor in response thereto.

14. A method of controlling the operation of the motor of a motor operated valve combination, including a valve yoke, a valve stem, a valve disc, a valve seat and a motor operator having a motor and drive means interconnecting the motor to the valve stem for movement of the valve stem in a first direction to move the valve disc toward and into engagement with the valve seat for closing the valve comprising the steps of:

sensing a parameter indicative of the forces experienced by the valve stem during valve closing;

determining the time rate of change of the sensed force parameter;

comparing the time rate of change of the sensed force parameter with a first predetermined limit;

comparing the sensed force parameter change to a second predetermined limit after the rate of change of the sensed force parameter exceeds the first predetermined limit; and stopping operation of the motor when the sensed force parameter exceeds the second predetermined limit.

15. A method of controlling the operation of the motor of a motor operated valve combination, including a valve yoke, a valve stem, a valve disc, a valve seat and a motor operator having a motor and drive means interconnecting the motor to the valve stem for movement of the valve stem in a first direction to move the valve disc toward and into engagement with the valve seat for closing the valve comprising the steps of:

sensing a parameter indicative of the forces experienced by the valve stem during valve closing;

determining the time rate of change of the sensed force parameter;

comparing the time rate of change of the sensed force parameter with a first predetermined limit; and stopping operation of the motor a predetermined time after the time rate of change of the sensed force parameter exceeds the first predetermined limit.

16. A method of controlling the operation of the motor of a motor operated valve combination, including a valve yoke, a valve stem, a valve disc, a valve seat and a motor operator having a motor and drive means interconnecting the motor to the valve stem for movement of the valve stem in a first direction to move the valve disc toward and into engagement with the valve seat for closing the valve comprising the steps of:

sensing a parameter indicative of the forces experienced by the valve stem during valve closing;

determining from the sensed force parameter the sum of packing and stem rejection forces experienced by the valve stem;

calculating the force required for wedging of the valve in a manner sufficient to prevent leakage through the valve; and stopping operation of the motor when the sensed force parameter reaches a predetermined limit established by the sum of the packing and stem rejection forces and the calculated force.

* * * * *